US012491329B2

(12) United States Patent
Chang

(10) Patent No.: US 12,491,329 B2
(45) Date of Patent: Dec. 9, 2025

(54) RESPIRATORY MASK

(71) Applicant: HSINER CO., LTD., Taichung (TW)

(72) Inventor: Eric Chang, Taichung (TW)

(73) Assignee: HSINER CO., LTD., Taichung (TW)

( * ) Notice: Subject to any disclaimer, the term of this patent is extended or adjusted under 35 U.S.C. 154(b) by 526 days.

(21) Appl. No.: 18/179,808

(22) Filed: Mar. 7, 2023

(65) Prior Publication Data

US 2024/0238627 A1 Jul. 18, 2024

(30) Foreign Application Priority Data

Jan. 18, 2023 (TW) ................................ 112102419

(51) Int. Cl.
*A62B 18/00* (2006.01)
*A62B 18/02* (2006.01)
*A62B 18/08* (2006.01)

(52) U.S. Cl.
CPC .......... *A62B 18/084* (2013.01); *A62B 18/025* (2013.01)

(58) Field of Classification Search
None
See application file for complete search history.

(56) References Cited

U.S. PATENT DOCUMENTS 3,441,020 A * 4/1969 Aasen ............... A61M 16/0683 128/205.25
5,853,002 A * 12/1998 Kawasaki .............. A61M 11/06 128/200.14
7,861,714 B2 * 1/2011 Smart .................. A61M 16/06 128/206.27
7,931,025 B2 * 4/2011 Eaton ................ A61M 16/0633 24/686
8,042,542 B2 * 10/2011 Ging ................. A61M 16/0616 128/206.28
8,051,855 B2 * 11/2011 Ho .................... A61M 16/0825 128/206.28
8,783,253 B2 * 7/2014 Flaherty ............. A41D 13/1138 128/206.13
9,616,190 B2 * 4/2017 Rummery .......... A61M 16/0683
9,950,131 B2 * 4/2018 Ng .................... A61M 16/0694
9,981,102 B2 * 5/2018 Veliss ................... A61M 16/06
9,987,451 B2 * 6/2018 Stegman ........... A61M 16/0003
10,034,994 B2 * 7/2018 McAuley .......... A61M 16/0622
10,118,009 B2 * 11/2018 Darkin .............. A61M 16/0825
10,500,363 B2 * 12/2019 Raje .................. A61M 16/0655
(Continued)

*Primary Examiner* — LaToya M Louis
(74) *Attorney, Agent, or Firm* — Birch, Stewart, Kolasch & Birch, LLP

(57) ABSTRACT

A respiratory mask include an annular frame having has a front flange surface and a rear flange surface. A single-piece flexible mask body include a second flange. Four engaging sets each of which has an engaging hole defined by an inner peripheral surface extending from the front flange surface to the rear flange surface, and an engaging rod extending from the second flange and having a retained part, a free part, and an impeding part connected between the free part and the retaining part. When the respiratory mask is in an assembled state, the retained part of the engaging rod of each engaging set is deformed by the inner peripheral surface corresponding to the engaging set, and the impeding part of the engaging rod of each engaging set impedes removal of the engaging rod from the engaging hole of the engaging set.

9 Claims, 8 Drawing Sheets

(56) References Cited

U.S. PATENT DOCUMENTS 11,633,564 B2* 4/2023 D'Souza ........... A61M 16/0622 128/205.25
11,642,482 B2* 5/2023 Rutan .................. A62B 18/025 128/206.24
11,986,595 B2* 5/2024 McLaren .......... A61M 16/0816
2008/0230066 A1* 9/2008 Chandaria .............. A41D 13/11 128/206.13
2008/0230068 A1* 9/2008 Rudolph ........... A61M 16/0683 128/206.28
2009/0126739 A1* 5/2009 Ng .................... A61M 16/0638 128/205.25
2010/0163049 A1* 7/2010 Osier ................. A61M 16/0611 29/428
2011/0265796 A1* 11/2011 Amarasinghe .... A61M 16/0616 128/206.28
2012/0180794 A1* 7/2012 Smart ............... A61M 16/0825 128/205.25
2012/0204869 A1* 8/2012 Gunaratnam ..... A61M 16/0605 128/202.27
2012/0204870 A1* 8/2012 McAuley .......... A61M 16/0622 128/207.18
2013/0014760 A1* 1/2013 Matula, Jr. ........ A61M 16/0633 128/205.25
2013/0228173 A1* 9/2013 Busch ............... A61M 16/0633 128/202.27
2014/0083431 A1* 3/2014 Burz ................. A61M 16/0633 264/255
2014/0166018 A1* 6/2014 Dravitzki .............. A61M 16/06 128/207.13
2014/0174446 A1* 6/2014 Prentice ............ A61M 16/0816 128/205.25
2014/0202463 A1* 7/2014 Ging ................. A61M 16/0057 128/205.25
2014/0283822 A1* 9/2014 Price ................. A61M 16/0633 128/202.17
2014/0305433 A1* 10/2014 Rothermel ............ A61M 16/06 128/202.27
2014/0373847 A2* 12/2014 Ng ........................ A61M 16/06 128/205.25
2015/0352308 A1* 12/2015 Cullen .............. A61M 16/0875 128/205.25
2016/0279371 A1* 9/2016 Dravitzki .......... A61M 16/0616
2016/0367778 A1* 12/2016 Eves ................. A61M 16/0638
2017/0021123 A1* 1/2017 Chang ............... A61M 16/0683
2017/0080173 A1* 3/2017 Barlow ............. A61M 16/0816
2017/0128687 A1* 5/2017 Price ................. A61M 16/0633
2017/0274168 A1* 9/2017 Kwok ................. A61M 16/065
2017/0333657 A1* 11/2017 Stephenson ......... A61M 16/208
2018/0001046 A1* 1/2018 Rummery .......... A61M 16/0611
2018/0021536 A1* 1/2018 Ng .................... A61M 16/0875 128/206.28
2018/0021537 A1* 1/2018 Ging .................... A62B 18/084 128/202.27
2018/0036505 A1* 2/2018 Bornholdt ......... A61M 16/0683
2018/0043127 A1* 2/2018 Matula, Jr. ........ A61M 16/0638
2018/0064899 A1* 3/2018 Ewers ............... A61M 16/0666
2018/0071475 A1* 3/2018 Howard ............ A61M 16/0825
2018/0361096 A1* 12/2018 Grashow ........... A61M 16/0622
2019/0224436 A1* 7/2019 Cheng ................. A61M 16/065
2019/0328989 A1* 10/2019 Gunaratnam ......... A61M 16/06

* cited by examiner

RESPIRATORY MASK

CROSS-REFERENCE TO RELATED APPLICATION

This application claims priority to Taiwanese Patent application No. 112102419, filed on Jan. 18, 2023.

FIELD

The disclosure relates to a respiratory mask, and more particularly to a respiratory mask that may be assembled.

BACKGROUND

FIGS. 1 and 2 illustrate a conventional respiratory mask 1, such as one disclosed in U.S. Pat. No. 8,069,855. The conventional respiratory mask 1 includes a rigid mask frame 11 and a flexible mask body 12. The rigid mask frame 11 defines a frame space 110, and has a ring portion 111, a loop portion 112, two rib portions 113 connected to the ring portion 111 and the loop portion 112, and a plurality of protrusions 114 (only one is shown) disposed on an outer periphery of the ring portion 111. The flexible mask body 12 defines an internal space 120, and has a flat central portion 121, a surrounding portion 122, a peripheral end portion 123, and annular flange 124. The surrounding portion 122 extends outwardly and curvedly from the flat central portion 121. The peripheral end portion 123 flares outwardly from the surrounding portion 122 to contact a user's face. The annular flange 124 protrudes transversely from the flat central portion 121, and defines a central hole 125 communicating with the internal space 120. The annular flange 124 is sleeved on the ring portion 111 and is blocked by the protrusions 114 to enable the rigid mask frame 11 to be assembled to the flexible mask body 12, and the surrounding portion 122 is disposed in the frame space 110 and is limited by the rib portions 113 and the loop portion 112.

It is convenient that a single size of the rigid mask frame 11 may be used for different sizes of the flexible mask body 12. However, when in use, rotation of the user's head may easily cause relative movement or rotation between the flexible mask body 12 and the rigid mask frame 11, thereby resulting in deformation of the central hole 125, and detachment of the flexible mask body 12 and the rigid mask frame 11. As a result, performance of the respiratory mask 1 is adversely affected, and there is still room for improvement of the conventional respiratory mask 1.

SUMMARY

Therefore, an object of the disclosure is to provide a respiratory mask that can alleviate at least one of the drawbacks of the prior art.

According to the disclosure, a respiratory mask includes a rigid mask frame unit, a single-piece flexible mask body, and an engaging unit.

The rigid mask frame unit includes an annular frame, a first flange, and a connecting rib. The annular frame has a front annular periphery, and a rear annular periphery that is opposite to the front annular periphery. The first flange extends outwardly from the rear annular periphery, and has a front flange surface and a rear flange surface that is opposite to the front flange surface. The connecting rib has two first connecting parts that extend forwardly from the front annular periphery, and a second connecting part that is connected between the first connecting parts and that extends in a left-right direction. The annular frame and the connecting rib cooperatively define a frame space.

The single-piece flexible mask body includes a central portion, a surrounding portion, and a peripheral portion. The central portion has a through hole. The surrounding portion extends outwardly and is curved rearwardly from the central portion. The peripheral portion has a second flange that extends outwardly from the surrounding portion, and a skin-friendly ring that extends rearwardly from the second flange. The central portion, the surrounding portion, and the peripheral portion cooperatively define a mask space that is in communication with the through hole of the central portion.

The engaging unit includes at least four engaging sets disposed between the first flange and the second flange in a spaced-apart manner. Each of the engaging sets has an engaging hole that extends through the first flange and that is defined by an inner peripheral surface extending from the front flange surface to the rear flange surface, and an engaging rod that extends forwardly from the second flange, that is flexible, and that has a retained part removably engaged with the engaging hole, a free part distal from the retained part and disposed outside the engaging hole, and an impeding part connected between the free part and the retaining part and disposed outside the engaging hole.

The respiratory mask is operable between a removal state and an assembled state.

When the respiratory mask is in the assembled state, the central portion and the surrounding portion of the flexible mask body are retained in the frame space by the connecting rib and the annular frame of the rigid mask frame unit, the peripheral portion of the flexible mask body is disposed outside the frame space, the rear flange surface of the first flange abuts against the second flange, the retained part of the engaging rod of each of the engaging sets is deformed by the inner peripheral surface corresponding to the engaging hole of the engaging set via engagement between the engaging rod and the engaging hole, and the impeding part of the engaging rod of each of the engaging sets impedes removal of the engaging rod from the engaging hole of the engaging set.

The rigid mask frame unit and the flexible mask body are operable by being respectively applied with two forces in opposite directions perpendicular to the left-right direction to disengage the engaging rods of the engaging sets respectively from the engaging holes of the engaging sets, thereby converting the respiratory mask from the assembled state to the removal state.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
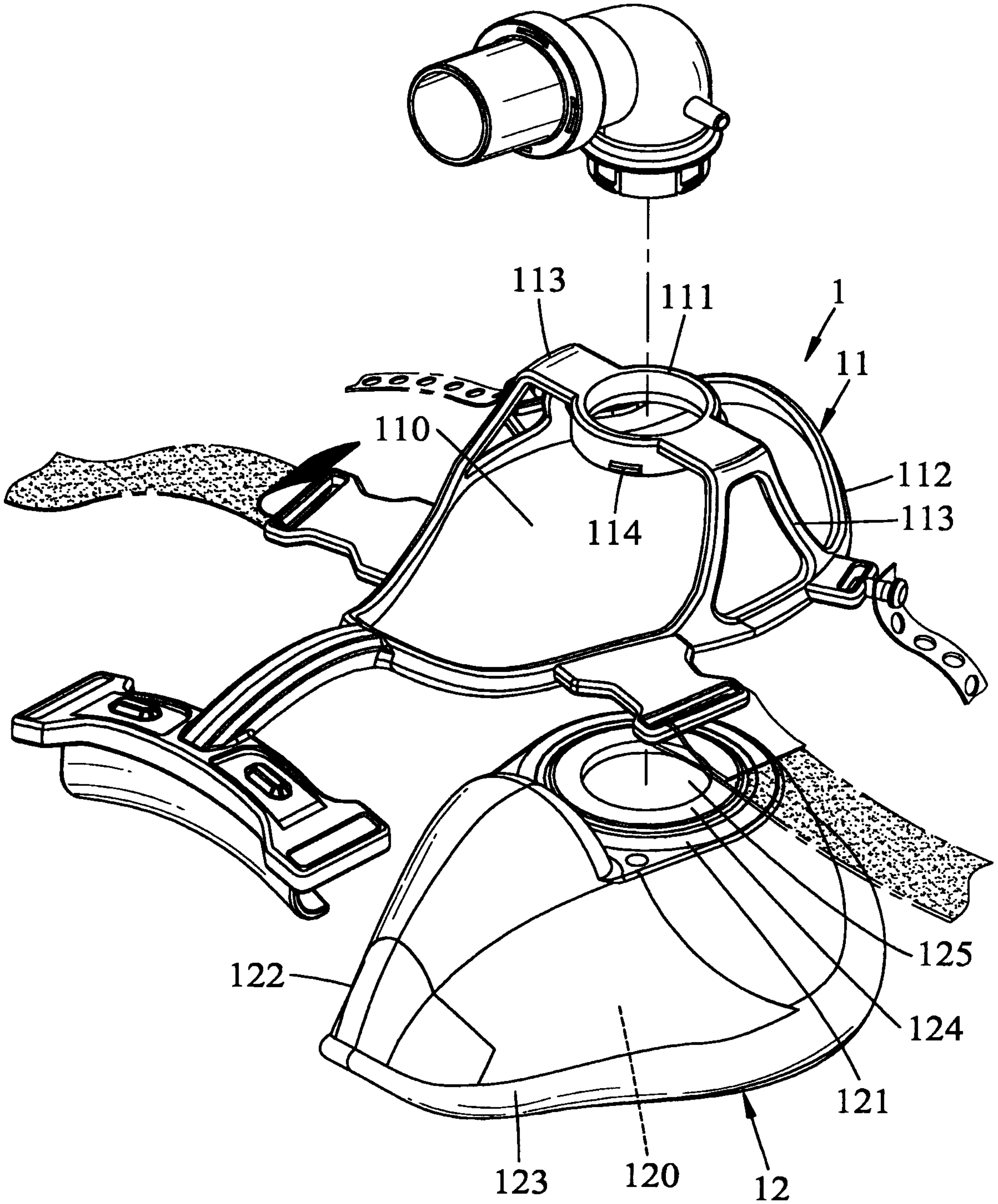
FIG.1 PRIOR ART
FIG. 1 is an exploded perspective view illustrating a conventional respiratory mask as disclosed in U.S. Pat. No. 8,069,855.
Figure 2:
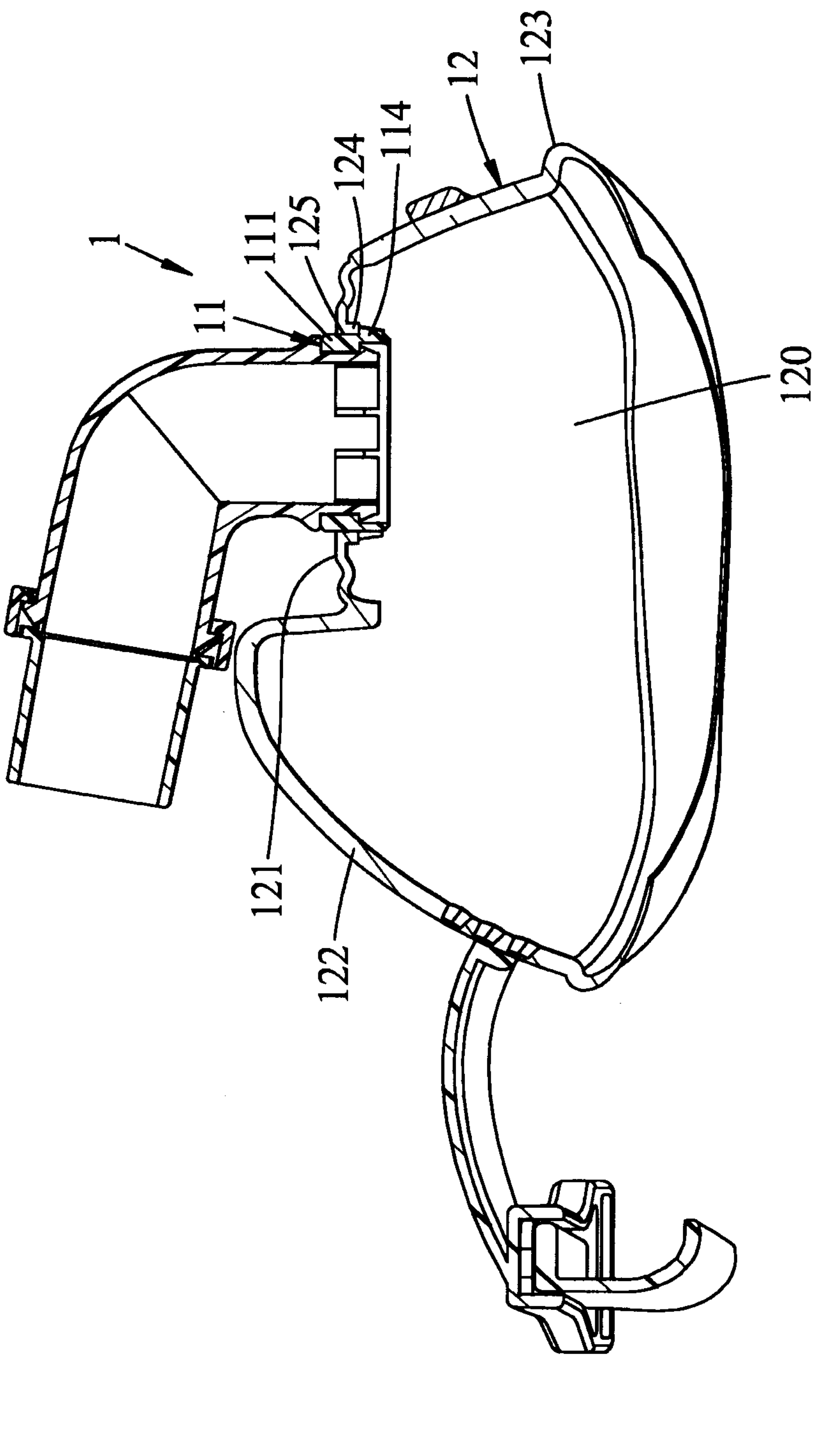
FIG.2 PRIOR ART
FIG. 2 is a schematic sectional view of the conventional respiratory mask.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
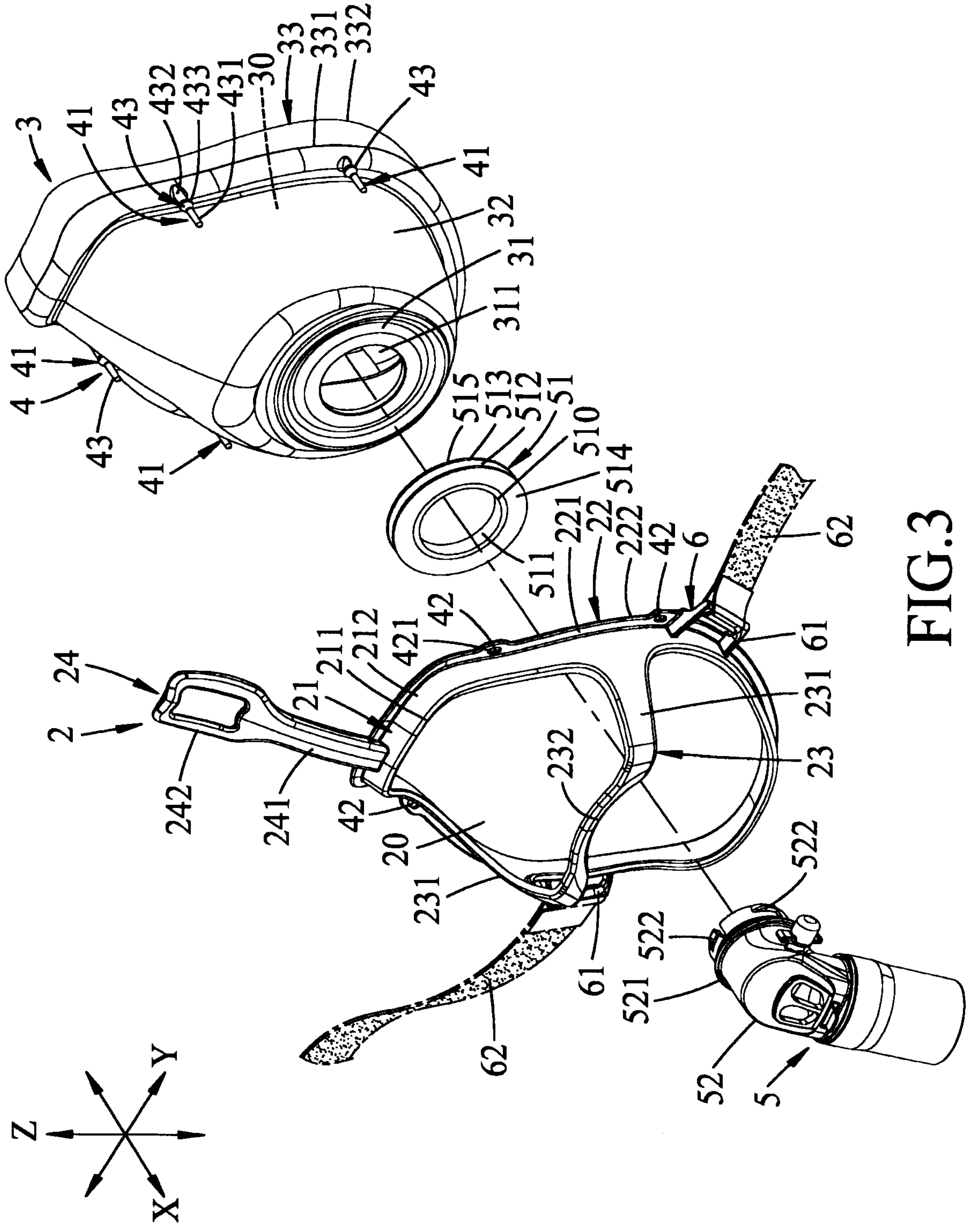
FIG. 3 is an exploded perspective view illustrating a respiratory mask according to an embodiment of the disclosure.
Figure 4:
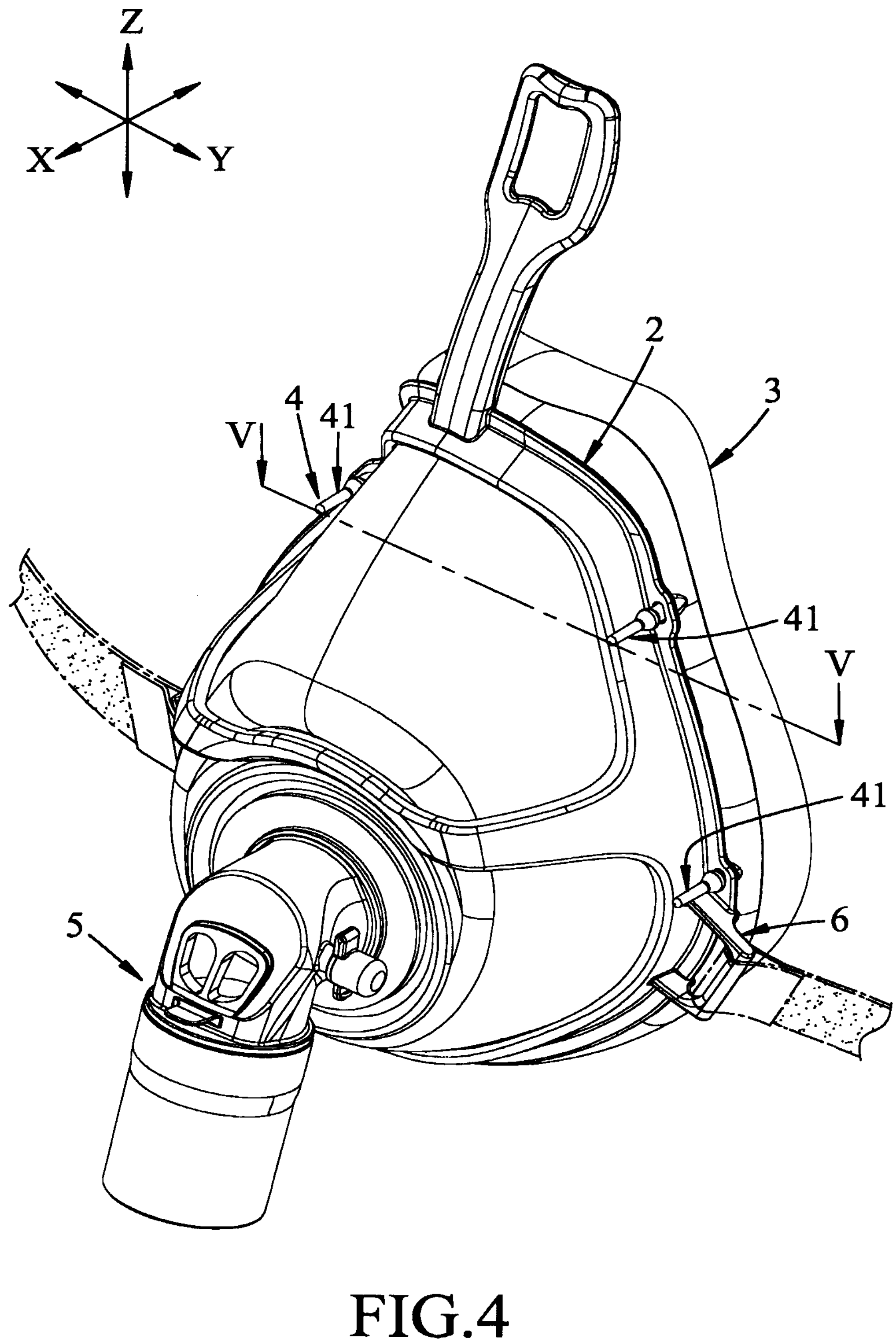
FIG. 4 is a perspective view illustrating the respiratory mask of the embodiment.

Referring to FIGS. 3 to 4, a respiratory mask according to an embodiment of the disclosure is illustrated and is adapted to be placed on a user's face (not shown). The respiratory mask of the disclosure includes a rigid mask frame unit 2, a single-piece flexible mask body 3, an engaging unit 4, an air intake unit 5, and a strap unit 6.

The rigid mask frame unit 2 includes an annular frame 21, a first flange 22, a connecting rib 23, and a forehead support seat 24. The annular frame 21 has a front annular periphery 211, and a rear annular periphery 212 that is opposite to the front annular periphery 211. The first flange 22 extends outwardly from the rear annular periphery 212, and has a front flange surface 221 and a rear flange surface 222 that is opposite to the front flange surface 221. The connecting rib 23 has two first connecting parts 231 that extend forwardly from the front annular periphery 211, and a second connecting part 232 that is connected between the first connecting parts 231 and that extends in a left-right direction (Y). The annular frame 21 and the connecting rib 23 cooperatively define a frame space 20.

The forehead support seat 24 has a supporting rod 241 that extends upwardly from the annular frame 21, and an abutting member 242 that is disposed on an end of the support rod 24 opposite to the annular frame 21 for abutting against the user's forehead (not shown).

The single-piece flexible mask body 3 is made of a flexible material, and includes a central portion 31, a surrounding portion 32, and a peripheral portion 33. The central portion 31 has a through hole 311 that extends in a front-rear direction (X) perpendicular to the left-right direction (Y). The surrounding portion 32 extends outwardly and is curved rearwardly from the central portion 31. The peripheral portion 33 has a second flange 331 that extends outwardly from the surrounding portion 32, and a skin-friendly ring 332 that extends rearwardly from the second flange 331 for contacting the user's face. The central portion 31, the surrounding portion 32, and the peripheral portion 33 cooperatively define a mask space 30 that is in communication with the through hole 311 of the central portion 31.

Figure 5:
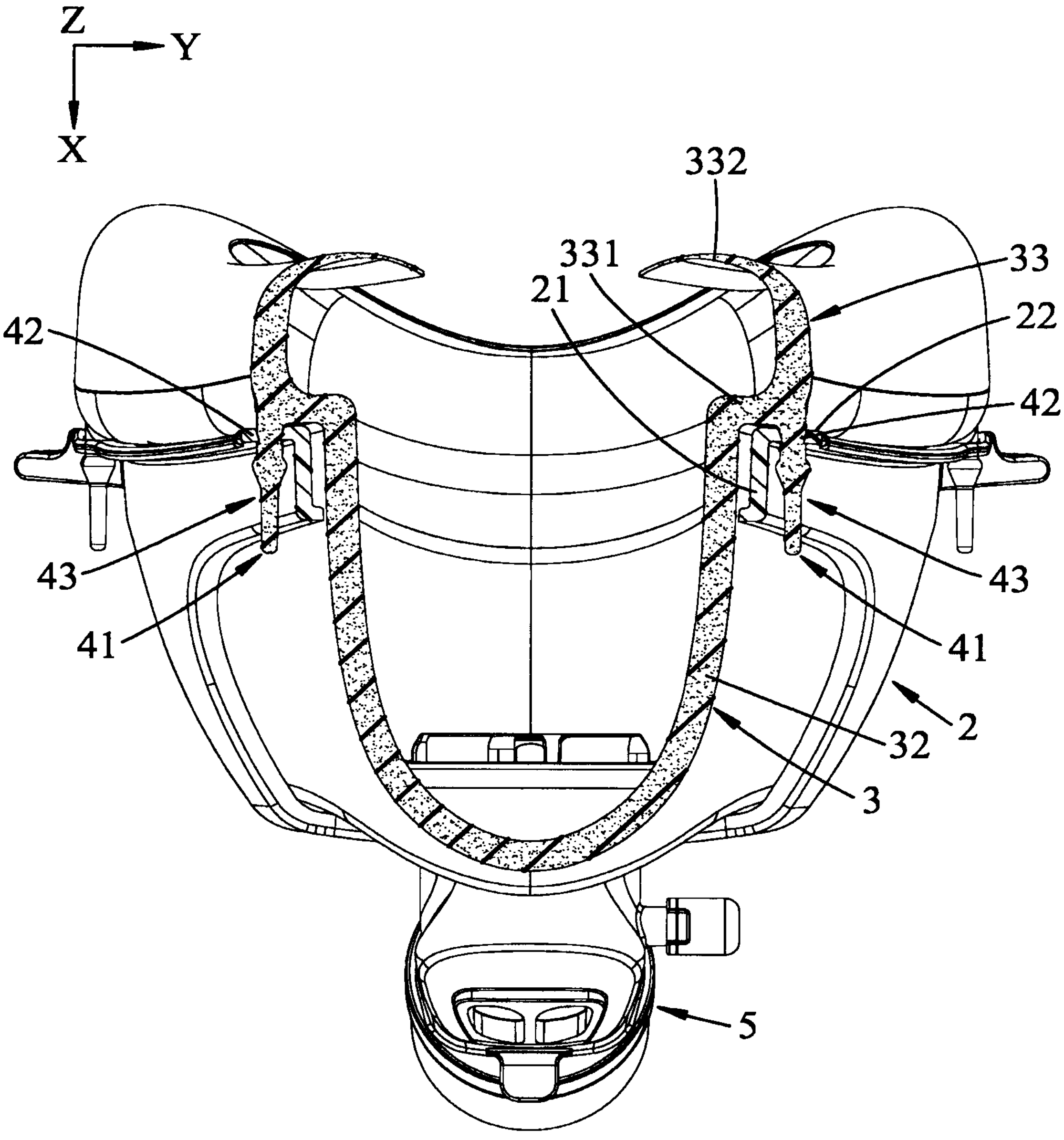
FIG. 5 is a schematic sectional view taken along line V-V of FIG. 4.
Figure 6:
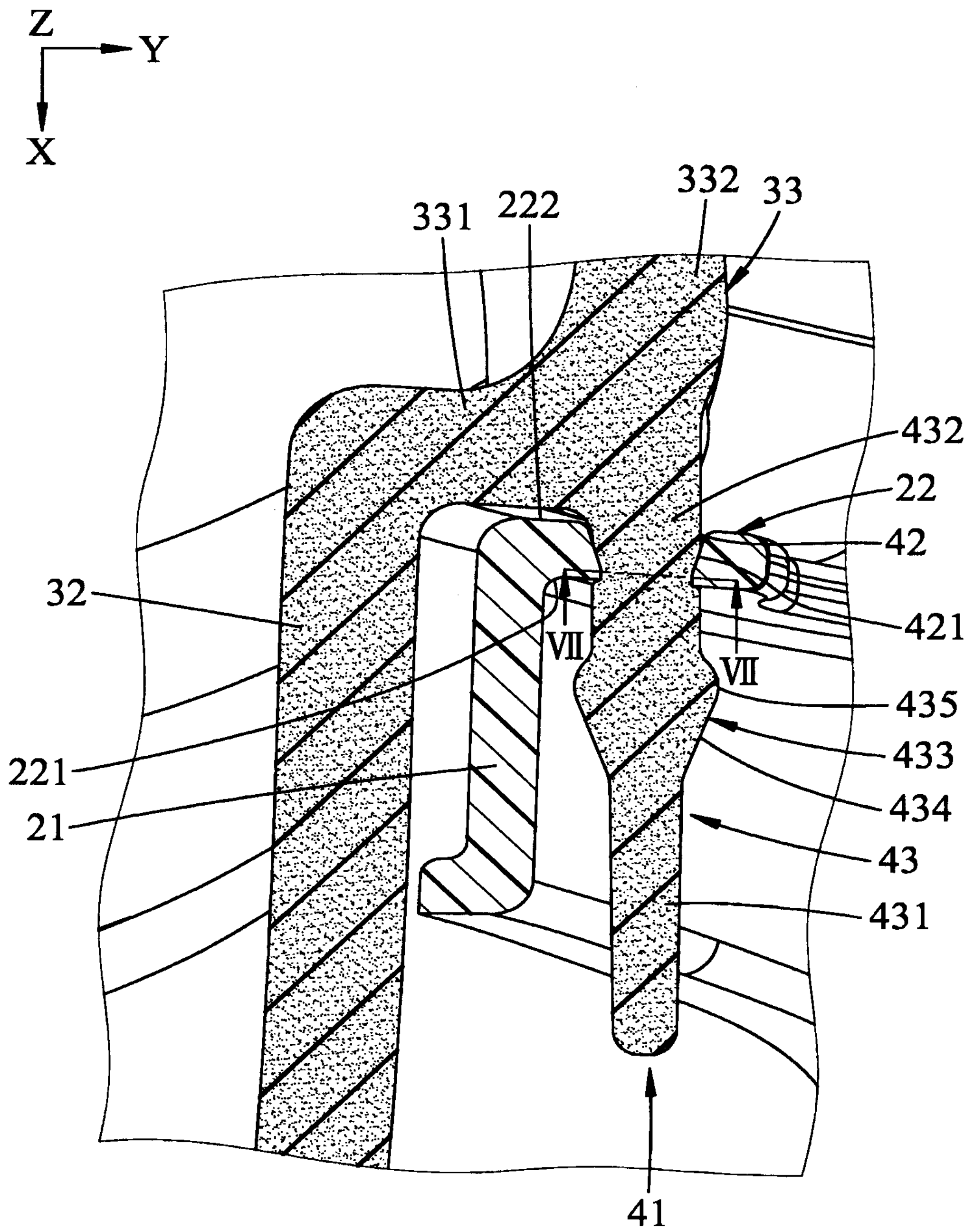
FIG. 6 is a partly enlarged sectional view taken from FIG. 5.

The engaging unit 4 includes four engaging sets 41 disposed between the first flange 22 and the second flange 331 in a spaced-apart manner. The engaging sets 41 are respectively disposed between upper left sides of the rigid mask frame unit 2 and the flexible mask body 3, between lower left sides of the rigid mask frame unit 2 and the flexible mask body 3, between upper right sides of the rigid mask frame unit 2 and the flexible mask body 3, and between lower right sides of the rigid mask frame unit 2 and the flexible mask body 3. As shown in FIGS. 5 and 6, each of the engaging sets 41 has an engaging hole 42 and an engaging rod 43 that are engageable with each other in the front-rear direction (X). For each of the engaging sets 41, the engaging hole 42 extends through the first flange 22, and is defined by an inner peripheral surface 421 extending from the front flange surface 221 to the rear flange surface 222 in the front-rear direction (X); the engaging rod 43 extends forwardly from the second flange 331, is flexible, and has a retained part 432 removably engaged with the engaging hole 42, a free part 431 distal from the retained part 432 and disposed outside the engaging hole 42, and an impeding part 433 connected between the free part 431 and the retaining part 432 and disposed outside the engaging hole 42. The impeding part 433 of the engaging rod 43 of each of the engaging sets 41 has a frustoconical section 434 that is circumferentially enlarged toward the retained part 432, and a truncated ball section 435 that is connected between the frustoconical section 434 and the retained part 432. An outer diameter of the truncated ball section 435 is greater than an outer diameter of the frustoconical section 434.

In this embodiment, the engaging rods 43 of the engaging sets 41 are integrally formed with the flexible mask body 3.

The air intake unit 5 includes a connecting ring 51 removably connected to the central portion 31 of the flexible mask body 3, and a tube 52 connected to the connecting ring 51. The connecting ring 51 has an inner annular surface 511, an outer annular surface 513, a front annular surface 514, and a rear annular surface 515. The inner annular surface 511 defines a communication hole 510. The outer annular surface 513 surrounds the inner annular surface 511 and is formed with an engaging recess 512. The front annular surface 514 is connected between the inner annular surface 511 and the outer annular recessed surface 513. The rear annular surface 515 is connected between the inner annular surface 511 and the outer annular recessed surface 513, and is opposite to the front annular surface 514. The connecting ring 51 is inserted into the through hole 311 of the central portion 31 of the flexible mask body 3, and is secured to the central portion 31 by engagement of the engaging recess 512 with the central portion 31. The tube 52 has a connecting end 521 and a plurality of resilient hooks 522 provided on the connecting end 521. The connecting end 521 extends through the communication hole 510 of the connecting ring 51; the resilient hooks 522 are engaged with the rear annular surface 515 of the connecting ring 51. Accordingly, the tube 52 is conveniently operable to be connected to or removed from the connecting ring 51.

The strap unit 6 includes a plurality of lugs 61 that are disposed on a left side and a right side of the annular frame 21, and a plurality of straps 62 that are respectively connected to the lugs 61 for wrapping around the user's head.

The respiratory mask of the disclosure is operable between a removal state and an assembled state. When the respiratory mask is in the assembled state, the central portion 31 and the surrounding portion 32 of the flexible mask body 3 are retained in the frame space 20 by the connecting rib 23 and the annular frame 21 of the rigid mask frame unit 2, the peripheral portion 33 of the flexible mask body 3 is disposed outside the frame space 20, the rear flange surface 222 of the first flange 22 abuts against the second flange 331, the retained part 432 of the engaging rod 43 of each of the engaging sets 41 is deformed by the inner peripheral surface 421 corresponding to the engaging hole 42 of the engaging set 41 via engagement between the engaging rod 43 and the engaging hole 42, and the impeding part 433 of the engaging rod 43 of each of the engaging sets 41 impedes removal of the engaging rod 43 from the engaging hole 42 of the engaging set 41. By virtue of the engagement between the engaging rods 43 and the engaging holes 42 of the engaging sets 41, the rigid mask frame unit 2 and the flexible mask body 3 are prevented from being rotated or moved relative to each other. The rigid mask frame unit 2 and the flexible mask body 3 are operable by being respectively applied with two forces that are in opposite directions in the front-rear direction (X) and that are greater than an impedance force between the impeding parts 433 of the engaging rods 43 and the engaging holes 42 to disengage the engaging rods 43 of the engaging sets 41 respectively from the engaging holes 42 of the engaging sets 41, thereby converting the respiratory mask from the assembled state to the removal state.

When in use, because the engaging sets 41 are respectively disposed between the upper left sides of the rigid mask frame unit 2 and the flexible mask body 3, between the lower left sides of the rigid mask frame unit 2 and the flexible mask body 3, between the upper right sides of the rigid mask frame unit 2 and the flexible mask body 3, and between the lower right sides of the rigid mask frame unit 2 and the flexible mask body 3, relative movement between the flexible mask body 3 and the rigid mask frame unit 2 is limited in the front-rear direction (X), the left-right direction (Y), and a top-bottom direction (Z) that is perpendicular to the front-rear direction (X) and the left-right direction (Y). As the straps 62 are tightened to pull the respiratory mask against the user's face, the rigid frame unit 2 is pressed toward the flexible mask body 3 so that the first flange 22 of the rigid mask frame unit 2 is pressed against the second flange 331 of the flexible mask body 3 to further tighten the engagement between the engaging rods 43 and the engaging holes 42 of the engaging sets 41. Therefore, when the user's head rotates, because the rigid frame unit 2 and the flexible mask body 3 are not moved or rotated relative to each other, not only detachment of the rigid frame unit 2 and the flexible mask body 3 may be prevented, but effectiveness of the respiratory mask of the disclosure is retained.

The following is worth to be mentioned.

Figure 7:
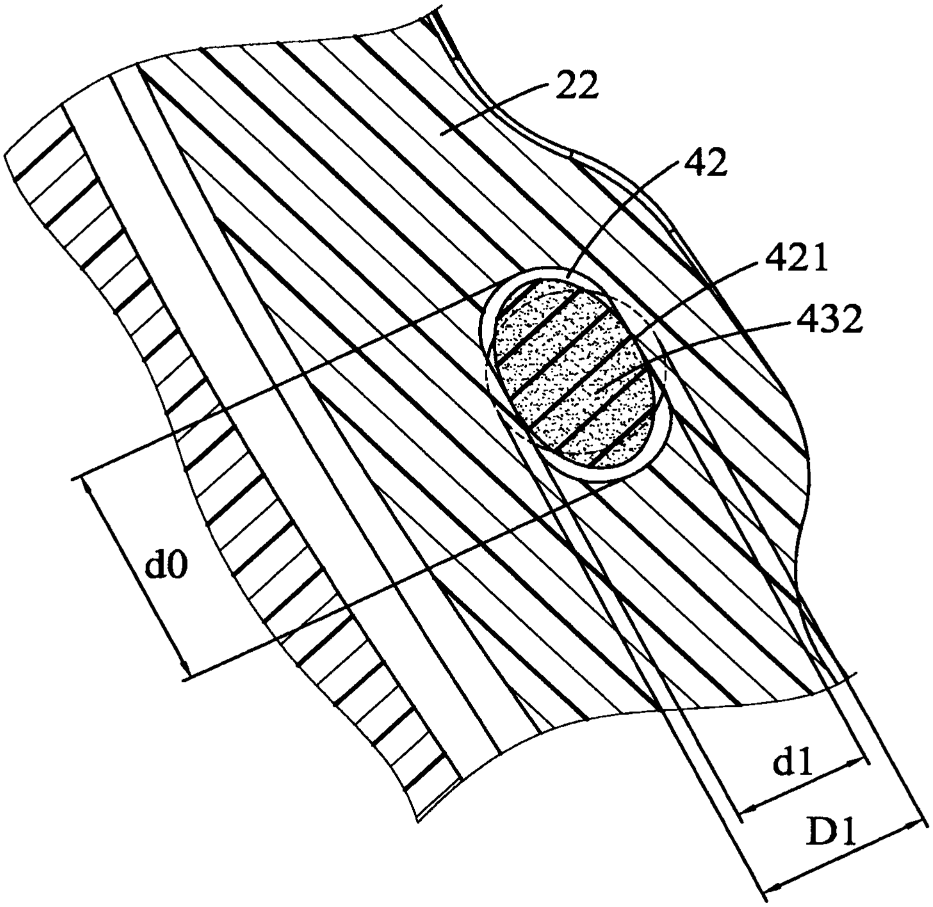
FIG. 7 is a fragmentary sectional view taken along line VII-VII of FIG. 6, illustrating that an engaging hole is an elliptical hole and that a retained part of an engaging rod has a circular cross section.
Figure 8:
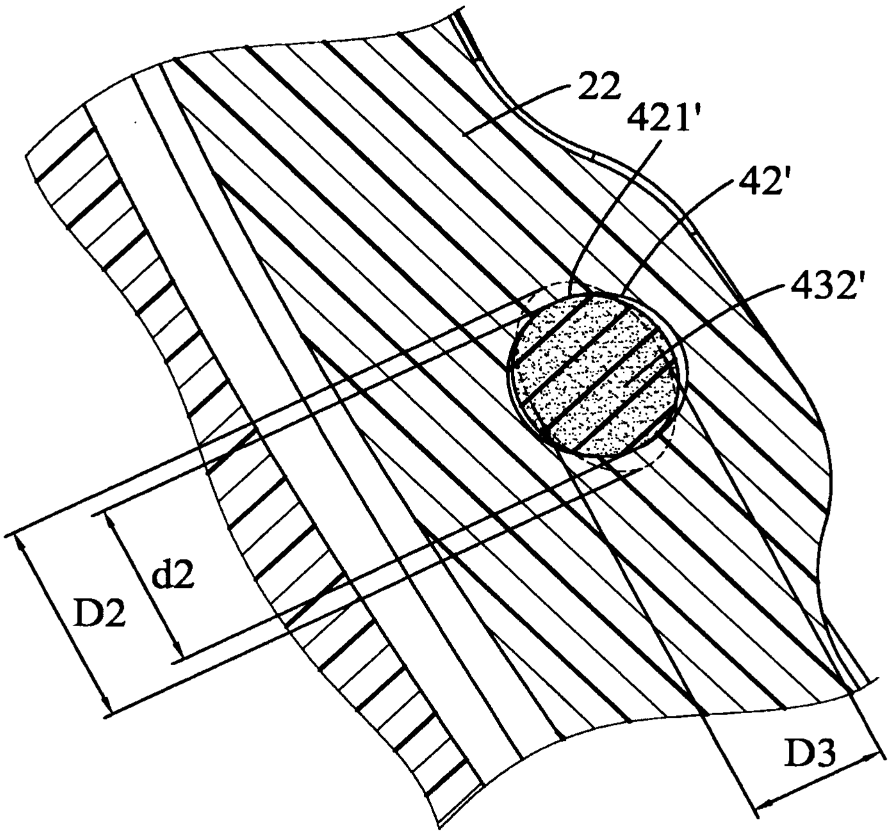
FIG. 8 is a view similar to FIG. 7, but illustrating that the engaging hole is a circular hole and that the retained part of the engaging rod has an elliptical cross section.

1. To assemble the respiratory of the disclosure, moving the rigid frame unit 2 and the flexible mask body 3 toward each other in the front-rear direction (X) enables the free part 431 of the engaging rod 43 of each of the engaging sets 41 to pass through the engaging hole 42 of the corresponding engaging set 41. As the impeding part 433 of the engaging rod 43 is engaged with the engaging hole 42 of the corresponding engaging seat 41, the free part 431 of the engaging rod 43 is pulled forwardly. Because the engaging rod 43 is flexible, and because the shape of the frustoconical section 434 of the engaging rod 43 serves as a guide, the free part 431 and the impeding part 433 of the engaging rod 43 may pass through the engaging hole 42, and the retained part 432 of the engaging rod 43 may be deformed and engaged with the inner peripheral surface 421 corresponding to the engaging hole 42 so that assembling of the respiratory mask may be accomplished. To disassemble the respiratory mask, the rigid mask frame unit 2 and the flexible mask body 3 are respectively applied with two opposite forces. By virtue of the truncated ball section 435 of the impeding part 433 of the engaging rod 43 of each of the engaging sets 41, the impeding parts 433 of the engaging rods 43 of the engaging sets 41 may be easily removed from the engaging holes 42 of the engaging sets 41 to accomplish disassembly of the respiratory mask.
2. For each of the engaging sets 41, the retained part 432 of the engaging rod 43 and the engaging hole 42 may vary in shape. As shown in FIG. 7, the engaging hole 42 of each of the engaging sets 41 is an elliptical hole that has a longer diameter (d0) and a shorter diameter (d1). The retained part 432 of the engaging rod 43 of each of the engaging sets 41 has a circular cross section that has a diameter (D1) that is greater than the shorter diameter (d1) of the engaging hole 42 of each of the engaging sets 41 and that is smaller than the longer diameter (d0) of the engaging hole 42 of each of the engaging sets 41. Because the retained part 432 of the engaging rod 43 is softer than the inner peripheral surface 421 corresponding to the engaging hole 42, and because the diameter (D1) of the retained part 432 is greater than the shorter diameter (d1) of the engaging hole 42, when the retained part 432 of the engaging rod 43 is engaged with the engaging hole 42, the retained part 432 of the engaging rod 43 is squashed and deformed by the inner peripheral surface 421, thereby strengthening the engagement between the engaging rod 43 and the engaging hole 42. Because the diameter (D1) of the retained part 432 is smaller than the longer diameter (d0) of the engaging hole 42, a contact area between the retained part 432 and the inner peripheral surface 421 may be reduced to facilitate the engagement between the engaging rod 43 and the engaging hole 42. FIG. 8 illustrates a variation of the engaging hole 42' and the engaging rod 43'. As shown in FIG. 8, the engaging hole 42' is a circular hole that has a hole diameter (d2). The retained part 432' of the engaging rod 43 has an elliptical cross section that has a shorter diameter (D3) that is smaller than the hole diameter (d2) of the engaging hole 42', and a longer diameter (D2) that is greater than the hole diameter (d2) of the engaging hole 42'. Because the retained part 432' of the engaging rod 43 is softer than the inner peripheral surface 421' corresponding to the engaging hole 42', and because the longer diameter (D2) of the retained part 432' is greater than the hole diameter (d2) of the engaging hole 42, when the retained part 432' of the engaging rod 43 is engaged with the engaging hole 42', the retained part 432' of the engaging rod 43 is squashed and deformed by the inner peripheral surface 421', thereby strengthening the engagement between the engaging rod 43 and the engaging hole 42'. Because the shorter diameter (D3) of the retained part 432' is smaller than the hole diameter (d2) of the engaging hole 42', a contact area between the retained part 432' and the inner peripheral surface 421' may be reduced to facilitate the engagement between the engaging rod 43 and the engaging hole 42'.
3. The number of the engaging sets 41 may vary and is not limited to four. The placement of the engaging sets may vary. For example, the engaging sets 41 may be respectively disposed between top portions of the rigid mask frame unit 2 and the flexible mask body 3, between bottom portions of the rigid mask frame unit 2 and the flexible mask body 3, between left portions of the rigid mask frame unit 2 and the flexible mask body 3, and between right portions of the rigid mask frame unit 2 and the flexible mask body 3 as long as the relative movement between the flexible mask body 3 and the rigid mask frame unit 2 may be prevented by the engaging sets 41.

In summary, advantages and effects of the respiratory mask are as follows.

1. The engaging unit 4 may effectively prevent the detachment of the rigid frame unit 2 and the flexible mask body 3 when the rigid frame unit 2 and the flexible mask body 3 are not intended to be detached from each other.
2. When in use, as the straps 62 are tightened to pull the respiratory mask against the user's face, the rigid frame unit 2 is pressed toward the flexible mask body 3 so that the first flange 22 of the rigid mask frame unit 2 is pressed against the second flange 331 of the flexible mask body 3 to further tighten the engagement between the engaging rods 43 and the engaging holes 42 of the engaging sets 41. During the use of the respiratory mask, the engaging unit 4 prevents not only the detachment of the rigid frame unit 2 and the flexible mask body 3, but also the relative movement or rotation between the rigid frame unit 2 and the flexible mask body 3. Accordingly, the effectiveness of the respiratory mask is further assured.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, the one or more features may be singled out and practiced alone without the another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A respiratory mask, comprising:

a rigid mask frame unit that includes
- an annular frame having a front annular periphery and a rear annular periphery that is opposite to said front annular periphery,
- a first flange extending outwardly from said rear annular periphery, and having a front flange surface and a rear flange surface that is opposite to said front flange surface, and
- a connecting rib having two first connecting parts that extend forwardly from said front annular periphery, and a second connecting part that is connected between said first connecting parts and that extends in a left-right direction, said annular frame and said connecting rib cooperatively defining a frame space;

a single-piece flexible mask body that includes
- a central portion having a through hole,
- a surrounding portion extending outwardly and curved rearwardly from said central portion, and
- a peripheral portion having a second flange that extends outwardly from said surrounding portion, and a skin-friendly ring that extends rearwardly from said second flange, said central portion, said surrounding portion, and said peripheral portion cooperatively defining a mask space that is in communication with said through hole of said central portion; and an engaging unit that includes at least four engaging sets disposed between said first flange and said second flange in a spaced-apart manner, each of said engaging sets having
- an engaging hole that extends through said first flange, and that is defined by an inner peripheral surface extending from said front flange surface to said rear flange surface, and
- an engaging rod that extends forwardly from said second flange, that is flexible, and that has a retained part removably engaged with said engaging hole, a free part distal from said retained part and disposed outside said engaging hole, and an impeding part connected between said free part and said retaining part and disposed outside said engaging hole;

wherein said respiratory mask being operable between a removal state and an assembled state;

wherein, when said respiratory mask is in the assembled state, said central portion and said surrounding portion of said flexible mask body are retained in said frame space by said connecting rib and said annular frame of said rigid mask frame unit, said peripheral portion of said flexible mask body is disposed outside said frame space, said rear flange surface of said first flange abuts against said second flange, said retained part of said engaging rod of each of said engaging sets is deformed by said inner peripheral surface corresponding to said engaging hole of said engaging set via engagement between said engaging rod and said engaging hole, and said impeding part of said engaging rod of each of said engaging sets impedes removal of said engaging rod from said engaging hole of said engaging set; and wherein, said rigid mask frame unit and said flexible mask body are operable by being respectively applied with two forces in opposite directions perpendicular to the left-right direction to disengage said engaging rods of said engaging sets respectively from said engaging holes of said engaging sets, thereby converting said respiratory mask from the assembled state to the removal state.

2. The respiratory mask as claimed in claim 1, wherein said engaging sets are respectively disposed between upper left sides of said rigid mask frame unit and said flexible mask body, between lower left sides of said rigid mask frame unit and said flexible mask body, between upper right sides of said rigid mask frame unit and said flexible mask body, and between lower right sides of said rigid mask frame unit and said flexible mask body.

3. The respiratory mask as claimed in claim 1, wherein:

said engaging hole of each of said engaging sets is an elliptical hole that has a longer diameter and a shorter diameter; and said retained part of said engaging rod of each of said engaging sets has a circular cross section that has a diameter that is greater than said shorter diameter of said engaging hole of each of said engaging sets.

4. The respiratory mask as claimed in claim 1, wherein:

said engaging hole of each of said engaging sets is a circular hole that has a hole diameter; and said retained part of said engaging rod of each of said engaging sets has an elliptical cross section that has a shorter diameter and a longer diameter that is greater than said hole diameter of said engaging hole of each of said engaging sets.

5. The respiratory mask as claimed in claim 1, wherein:

for each of said engaging sets, said impeding part of said engaging rod has a frustoconical section that is circumferentially enlarged toward said retained part, and a truncated ball section that is connected between said frustoconical section and said retained part; and an outer diameter of said truncated ball section is greater than an outer diameter of said frustoconical section.

6. The respiratory mask as claimed in claim 1, wherein:

said rigid mask frame unit further includes a forehead support seat; and said forehead support seat has a supporting rod that extends upwardly from said annular frame, and an abutting member that is disposed on an end of said support rod opposite to said annular frame.

7. The respiratory mask as claimed in claim 1, wherein:

said respiratory mask further comprises an air intake unit that includes a connecting ring removably connected to said central portion of said flexible mask body, and a tube connected to said connecting ring;

said connecting ring has an inner annular surface that defines a communication hole, an outer annular surface that surrounds said inner annular surface and that is formed with an engaging recess, a front annular surface that is connected between said inner annular surface and said outer annular recessed surface, and a rear annular surface that is connected between said inner annular surface and said outer annular recessed surface and that is opposite to said front annular surface; and said connecting ring is inserted into said through hole of said central portion of said flexible mask body, and is secured to said central portion by engagement of said engaging recess with said central portion.

8. The respiratory mask as claimed in claim 7, wherein:

said tube has a connecting end and a plurality of resilient hooks provided on said connecting end; and said connecting end extends through said communication hole of said connecting ring, said resilient hooks being engaged with said rear annular surface of said connecting ring.

9. The respiratory mask as claimed in claim 1, wherein:

said respiratory mask further comprises a strap unit; and said strap unit includes a plurality of lugs that are disposed on a left side and a right side of said annular frame, and a plurality of straps that are respectively connected to said lugs.

* * * * *